No. 657,497. Patented Sept. 4, 1900.
E. W. PARISH.
APPARATUS FOR COOKING, HEATING, &c.
(Application filed Mar. 6, 1900.)

(No Model.)

Witnesses

Inventor
Edward W. Parish
by James L. Norris
atty

UNITED STATES PATENT OFFICE.

EDWARD WILLIAM PARISH, OF LONDON, ENGLAND, ASSIGNOR OF ONE-HALF TO JEFFERY WILLIAM EADY, OF SAME PLACE.

APPARATUS FOR COOKING, HEATING, &c.

SPECIFICATION forming part of Letters Patent No. 657,497, dated September 4, 1900.

Application filed March 6, 1900. Serial No. 7,526. (No model.)

*To all whom it may concern:*

Be it known that I, EDWARD WILLIAM PARISH, commercial traveler, a subject of the Queen of Great Britain, residing at Parish's Patent Steam Jacketted Cooker Company, Limited, of 97$^D$ Queen Victoria street, London, England, have invented certain new and useful Improvements in Low-Pressure Steam Apparatus for Cooking, Heating, Drying, Evaporating, Steam-Generating, and Similar Purposes, of which the following is a specification.

This invention relates to apparatus for cooking, heating, drying, evaporating, steam-generating, or similar purposes, and has for its primary object to so construct such apparatus that a constant supply of hot water or other liquid can be obtained therefrom simultaneously with its employment as a cooker, heater, drier, evaporator, steam-generator, or the like without interfering with its effectual operation as such.

According to this invention the water-space of the part of the apparatus wherein the cooking or similar operation is performed is connected at the bottom to a water-chamber interposed between the said water-space and the burner or furnace of the apparatus, such water-chamber being provided with a longitudinal passage or passages for the products of combustion and heated gases to pass through and heat the aforesaid water-space. The hot-water-supply part of the apparatus comprises a water-jacket surrounding the cooking part and is connected with the water-chamber and the water-space by suitable conduits. The cold water is admitted to the lower part of the water-jacket from a lateral compartment. The hot water is withdrawn from the upper part of the water-jacket or of the water-chamber.

In order that the invention may be clearly understood and readily carried into effect, it will be described more fully with reference to the accompanying drawings, in which—

Figure 1:
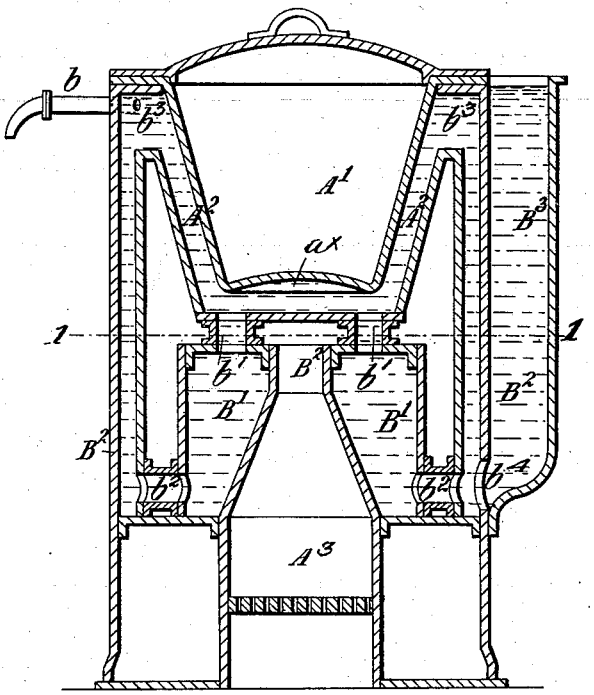
Figure 2:
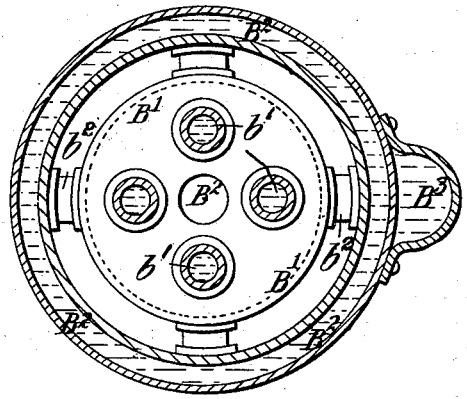

Figure 1 is a vertical section, and Fig. 2 a transverse section, on the line 1 1, showing a satisfactory form of the apparatus.

The part of the apparatus wherein the cooking, heating, or other aforesaid operation is effected comprises a pan $A'$, within which the substance to be cooked or similarly treated is placed, such pan being surrounded by a space or chamber $A^2$, containing water or other suitable liquid, which is heated from a furnace $A^3$, arranged below the said space or chamber. The bottom of the pan $A'$ is preferably made with a concavity $a^x$ in order to assist in preventing the incoming cold water from too quickly rising as it gets heated in the space or chamber $A^2$ and from too suddenly reducing the temperature of the water at the upper portion of this space or chamber. Baffle-plates or any other suitable contrivance may, however, be employed for this purpose. The water-space $A^2$ is connected at the bottom by conduits $b'$ to the upper part of the water-chamber $B'$, which is surrounded by the water-jacket $B^2$, forming part of the hot-water-supply part of the apparatus. The said water-chamber $B'$ has a central conical passage $B^2$, through which the products of combustion or heated gases from the furnace $A^3$ pass. The lower part of the water-jacket is connected by conduits $b^2$ to the lower part of the said water-chamber, and the upper part of said water-jacket communicates at $b^3$ with the upper part of the water-space $A^2$, into which the cooking-pan $A'$ dips.

$B^3$ is a lateral chamber or compartment into which the cold water enters and from which it flows through the opening $b^4$ to the water-jacket $B^2$.

$b$ is the pipe through which the hot water is withdrawn from the apparatus.

The incoming cold water enters the mouth of the lateral compartment or chamber $B^3$ and reaches the water-chamber $B'$ through the conduits $b^2$, wherein it rises and reaches the water-space $A^2$ through the conduits $b'$, a corresponding quantity of hot water escaping through a suitable receptacle. The cold water as it becomes heated rises to the surface of the said water-space $A^2$, ready to pass away through the pipe $b$, when another quantity of cold water is admitted to the lateral compartment or chamber $B^3$. It will be understood that so long as no cold water is poured or admitted into the chamber $B^3$ no hot water will escape from the apparatus, and that by regulating the quantity of cold water entering said chamber a constant supply of hot water will be obtained from the apparatus through the said pipe $b$.

Having thus described my invention, what I claim is—

1. In apparatus for cooking, heating and similar purposes and for simultaneously supplying hot liquid, the combination with the cooking or heating chamber, of an annular chamber surrounding the liquid-space of said latter chamber and communicating therewith at its upper part, of an outlet-pipe for hot water from the upper part of said liquid-space, of an intermediate liquid-chamber located beneath the said liquid-space and communicating therewith, of lateral conduits connecting the said annular chamber and the said intermediate chamber near their lower ends, and of an external compartment which is open at the top and communicates with the said annular chamber through an opening near the bottom thereof, substantially as and for the purpose described.

2. In apparatus for cooking, heating and similar purposes and for simultaneously supplying hot liquid, the combination with the cooking or heating chamber, of an annular chamber surrounding the liquid-space of said latter chamber and communicating therewith at its upper part, of an outlet-pipe for hot water from the upper part of said liquid-space, of an intermediate liquid-chamber having a central flue therein and located beneath the said liquid-space and communicating therewith, of lateral conduits connecting the said annular chamber and the said intermediate chamber near their lower ends, of an external compartment which is open at the top and communicates with the said annular chamber through an opening near the bottom thereof and of a furnace located beneath said central flue in the intermediate liquid-chamber, all substantially as and for the purpose described.

In testimony whereof I have hereunto set my hand, in presence of two subscribing witnesses, this 23d day of February, 1900.

EDWARD WILLIAM PARISH.

Witnesses:
J. COLLINS,
T. W. McLELLAN.